US012743304B2

(12) United States Patent
Herzig et al.

(10) Patent No.: US 12,743,304 B2
(45) Date of Patent: Sep. 22, 2026

(54) MACHINE LEARNING MODELS FOR GENERATING EXECUTABLE SEQUENCES

(71) Applicant: Evernorth Strategic Development, Inc., St. Louis, MO (US)

(72) Inventors: Kevin Herzig, Fort Myers, FL (US); Neha Jain, Bridgewater, NJ (US); Christina M. Vallery, Eastsound, WA (US); Andrew Long, Austin, TX (US); Shauna Mooney, Henrico, VA (US)

(73) Assignee: Evernorth Strategic Development, Inc., St. Louis, MO (US)

( * ) Notice: Subject to any disclaimer, the term of this patent is extended or adjusted under 35 U.S.C. 154(b) by 615 days.

(21) Appl. No.: 18/205,203

(22) Filed: Jun. 2, 2023

(65) Prior Publication Data

US 2023/0393894 A1 Dec. 7, 2023

Related U.S. Application Data

(60) Provisional application No. 63/348,433, filed on Jun. 2, 2022.

(51) Int. Cl.
*G06F 9/48* (2006.01)
*G06F 9/54* (2006.01)
*G06Q 30/0601* (2023.01)

(52) U.S. Cl.
CPC ............ *G06F 9/4881* (2013.01); *G06F 9/542* (2013.01); *G06Q 30/0635* (2013.01)

(58) Field of Classification Search
CPC ... G06F 9/4881; G06F 9/542; G06Q 30/0635; G16H 10/60; G16H 40/20; G06N 20/00
See application file for complete search history.

(56) References Cited

U.S. PATENT DOCUMENTS 6,842,877 B2 * 1/2005 Robarts ............... G06F 21/6245 715/740
6,999,987 B1 2/2006 Billingsley
(Continued)

FOREIGN PATENT DOCUMENTS

CN 109671475 A 4/2019
CN 110046186 A 7/2019
(Continued)

OTHER PUBLICATIONS

Te-Wei Kuo and A. K. Mok, "Real-time data semantics and similarity-based concurrency control," in IEEE Transactions on Computers, vol. 49, No. 11, pp. 1241-1254, Nov. 2000, doi: 10.1109/12.895940. (Year: 2000).*

(Continued)

*Primary Examiner* — Sun M Li
(74) *Attorney, Agent, or Firm* — Miller Johnson

(57) ABSTRACT

A system includes processor hardware configured to execute instructions from memory hardware. The instructions include, in response to designation of an entity within a data store, obtaining information and determining a condition of the designated entity. The instructions include, based on the condition of the designated entity, identifying a set of states. The instructions include obtaining trigger conditions for the selected state, each specifying a set of satisfaction criteria. The instructions include determining whether each trigger condition is satisfied by evaluating the satisfaction criteria based on data corresponding to the designated entity. The instructions include selectively selecting another state based on whether the trigger conditions are satisfied. The instructions include determining, and scheduling for execution, an executable sequence based on the selected state.

20 Claims, 8 Drawing Sheets

(56) References Cited

U.S. PATENT DOCUMENTS 7,100,197 B2 8/2006 Rail
7,103,556 B2 9/2006 Del Rey
7,433,828 B2 10/2008 Brinkman
7,448,047 B2 11/2008 Poole
7,519,577 B2 4/2009 Brundage
7,707,627 B2 4/2010 Hirsh
7,752,289 B2 7/2010 Kikkawa
7,874,011 B2 1/2011 Boss
7,979,894 B2 7/2011 Royyuru
8,045,475 B2 10/2011 Mohan
8,401,871 B2 3/2013 Fotsch
8,505,077 B2 8/2013 Kulkarni
8,566,121 B2 10/2013 Ramasubramanian
8,826,021 B2 9/2014 Savage
8,924,236 B2 12/2014 Marchosky
8,935,272 B2 1/2015 Ganti
8,955,058 B2 2/2015 Castro
8,979,627 B2 3/2015 Walker
9,195,822 B2 11/2015 Carlson
9,239,834 B2 1/2016 Donabedian
9,244,952 B2 1/2016 Ganti
9,282,425 B2 3/2016 Tomkins
9,305,059 B1 4/2016 Glickman
9,497,178 B2 11/2016 Chow
9,516,008 B2 12/2016 Chow
9,563,784 B2 2/2017 Meredith
9,686,674 B2 6/2017 Lin
9,787,692 B2 10/2017 Peleg
9,836,778 B2 12/2017 Lyman
9,842,034 B2 12/2017 Heliker
9,854,431 B2 12/2017 Lin
9,927,983 B2 3/2018 Benisty
9,977,867 B2 5/2018 Greene
10,027,654 B2 7/2018 Bringer
10,261,695 B2 4/2019 Benisty
10,270,839 B2 4/2019 Andreou
10,311,450 B2 6/2019 Bjelajac
10,380,537 B2 8/2019 Agasti
10,423,356 B2 9/2019 Iyengar
10,437,841 B2 10/2019 Robichaud
10,445,508 B2 10/2019 Sher-Jan
10,475,140 B2 11/2019 Patel
10,484,547 B2 11/2019 Weeks
10,503,746 B2 12/2019 Choudhary
10,515,188 B2 12/2019 Soto
10,565,509 B2 2/2020 London
10,613,964 B2 4/2020 Davis
10,621,880 B2 4/2020 Boguraev
10,629,310 B2 4/2020 Livesay
10,650,430 B2 5/2020 Fine
10,650,928 B1 * 5/2020 Larson .................. G16H 40/67
10,659,399 B2 5/2020 Foerster
10,691,774 B2 6/2020 Thorpe
10,692,159 B2 6/2020 Charkov
10,706,971 B2 7/2020 Ramaci
10,720,232 B2 7/2020 Giordano
10,726,079 B2 7/2020 Makaremi
10,733,546 B2 8/2020 Pilkington
10,733,903 B2 8/2020 Kurowski
10,811,006 B2 10/2020 Yamagami
10,817,589 B2 10/2020 Lara
10,834,221 B2 11/2020 Tong
10,839,514 B2 * 11/2020 Accomazzi ............ G16H 30/20
10,860,655 B2 12/2020 Murphey
10,915,605 B2 2/2021 Stadler
10,964,430 B2 3/2021 Willard
10,978,185 B2 4/2021 Aagesen
10,997,251 B2 5/2021 Tran
11,107,563 B2 8/2021 Vogt
11,314,492 B2 * 4/2022 Jain ......................... H04L 67/34
11,923,079 B1 3/2024 Schilling
2002/0065682 A1 5/2002 Goldenberg
2002/0194024 A1 12/2002 Kleinschmidt
2004/0267704 A1 12/2004 Subramanian
2005/0159986 A1 7/2005 Breeland
2006/0154642 A1 7/2006 Scannell
2006/0241972 A1 10/2006 Lang
2006/0271405 A1 11/2006 Cipolle
2007/0038474 A1 2/2007 Halsted
2007/0219795 A1 9/2007 Park
2007/0219958 A1 9/2007 Park
2007/0239516 A1 10/2007 Smith
2010/0042578 A1 2/2010 Leuthardt
2010/0088245 A1 4/2010 Harrison
2010/0250279 A1 9/2010 Guggenheim
2011/0246251 A1 10/2011 Saunders
2013/0103434 A1 4/2013 Cazeaux
2013/0179178 A1 7/2013 Vemireddy
2014/0074506 A1 3/2014 Oliver
2014/0210618 A1 7/2014 Poe
2014/0214659 A1 7/2014 Hansen
2014/0249889 A1 9/2014 Park
2014/0297308 A1 10/2014 Baruch
2014/0310306 A1 10/2014 Sawczuk
2014/0316815 A1 10/2014 Chen
2014/0372137 A1 12/2014 Tryon
2015/0142459 A1 5/2015 Nichols
2015/0297078 A1 10/2015 Gross
2015/0310559 A1 10/2015 Kaafarani
2015/0339393 A1 11/2015 Chung
2015/0347681 A1 12/2015 Bartlett, II
2015/0350611 A1 12/2015 Pearson
2016/0019316 A1 1/2016 Murphey
2016/0110523 A1 4/2016 Francois
2016/0173822 A1 6/2016 Lemmey
2016/0189317 A1 6/2016 Papandrea
2017/0011179 A1 1/2017 Arshad
2017/0032394 A1 2/2017 Stevens
2017/0180518 A1 6/2017 Choi
2017/0236188 A1 * 8/2017 Puck .................. G06Q 30/0635
705/26.81
2017/0270532 A1 9/2017 Livesay
2017/0374568 A1 12/2017 Heath
2018/0054710 A1 2/2018 Gum
2018/0075211 A1 * 3/2018 Eng ........................ G16H 20/10
2018/0101659 A1 4/2018 Ninan
2018/0268417 A1 9/2018 Livesay
2018/0293234 A1 10/2018 Resnofendri
2019/0034589 A1 1/2019 Chen
2019/0034590 A1 1/2019 Oren
2019/0052720 A1 2/2019 Guo
2019/0065499 A1 2/2019 Wagstaff
2019/0074080 A1 3/2019 Appelbaum
2019/0103173 A1 4/2019 Power
2019/0138734 A1 5/2019 Sher-Jan
2019/0156295 A1 5/2019 Lu
2019/0198181 A1 6/2019 Livesay
2019/0272925 A1 9/2019 Barrett
2020/0042577 A1 2/2020 Kasa
2020/0241895 A1 7/2020 Voss
2020/0251194 A1 8/2020 Vogt
2020/0279641 A1 * 9/2020 Nida ...................... G06N 20/00
2020/0322703 A1 10/2020 Bures
2020/0342455 A1 10/2020 Poteet, III
2022/0028513 A1 1/2022 Gangaikondan-Iyer
2022/0100647 A1 * 3/2022 Hamid .................. G06F 11/323
2022/0180988 A1 * 6/2022 Sragow .................. G06Q 40/08
2023/0017196 A1 * 1/2023 Jain ......................... H04L 67/01
2023/0393894 A1 12/2023 Herzig
2023/0395204 A1 12/2023 Mitjans
2023/0395213 A1 12/2023 Jain
2023/0395214 A1 12/2023 Needs
2023/0395215 A1 12/2023 Long
2023/0395243 A1 12/2023 Teeple

FOREIGN PATENT DOCUMENTS

CN 110691548 A 1/2020
CN 113380351 A 9/2021
EP 3362890 A1 8/2018
EP 3489958 A1 5/2019
EP 3634204 A1 4/2020
EP 3799056 A1 3/2021
KR 101575146 B1 12/2015

(56) References Cited

FOREIGN PATENT DOCUMENTS

| | | | |
|---|---|---|---|
| KR | 20200003407 | A | 1/2020 |
| WO | 2001013274 | A2 | 2/2001 |
| WO | 200120488 | A1 | 3/2001 |
| WO | 2019022779 | A1 | 1/2019 |

OTHER PUBLICATIONS

M. Chechik and J. Gannon, "Automatic analysis of consistency between requirements and designs, " in IEEE Transactions on Software Engineering, vol. 27, No. 7, pp. 651-672, Jul. 2001, doi: 10.1109/32.935856. (Year: 2001).*

Luo G, Stone BL, Johnson MD, Tarczy-Hornoch P, Wilcox AB, Mooney SD, Sheng X, Haug PJ, Nkoy FL. Automating Construction of Machine Learning Models With Clinical Big Data: roposal Rationale and Methods. JMIR Res Protoc. Aug. 2, 20179;6(8):e175. doi: 10.2196/resprot.7757. PMID: 28851678; Pmcid: PMC5596298 (Year: 2017).*

Feng J, Phillips RV, Malenica I, Bishara A, Hubbard AE, Celi LA, Pirracchio R. Clinical artificial intelligence quality improvement: towards continual monitoring and updating of AI algorithms in healthcare. NPJ Digit Med. May 3, 20221;5(1):66. doi: 10.1038/s41746-022-00611-y. PMID: 35641814; PMCID: PMC9 (Year: 2022).*

Qualtrics, Question Randomization, https://www.qualtrics.com/support/survey-platform/survey-module/block-options/question-randomization/, accessed Aug. 11, 2020.

* cited by examiner

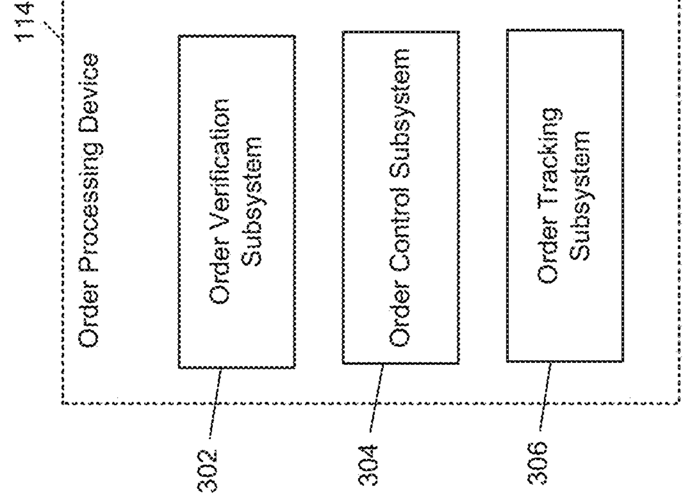
FIG. 3

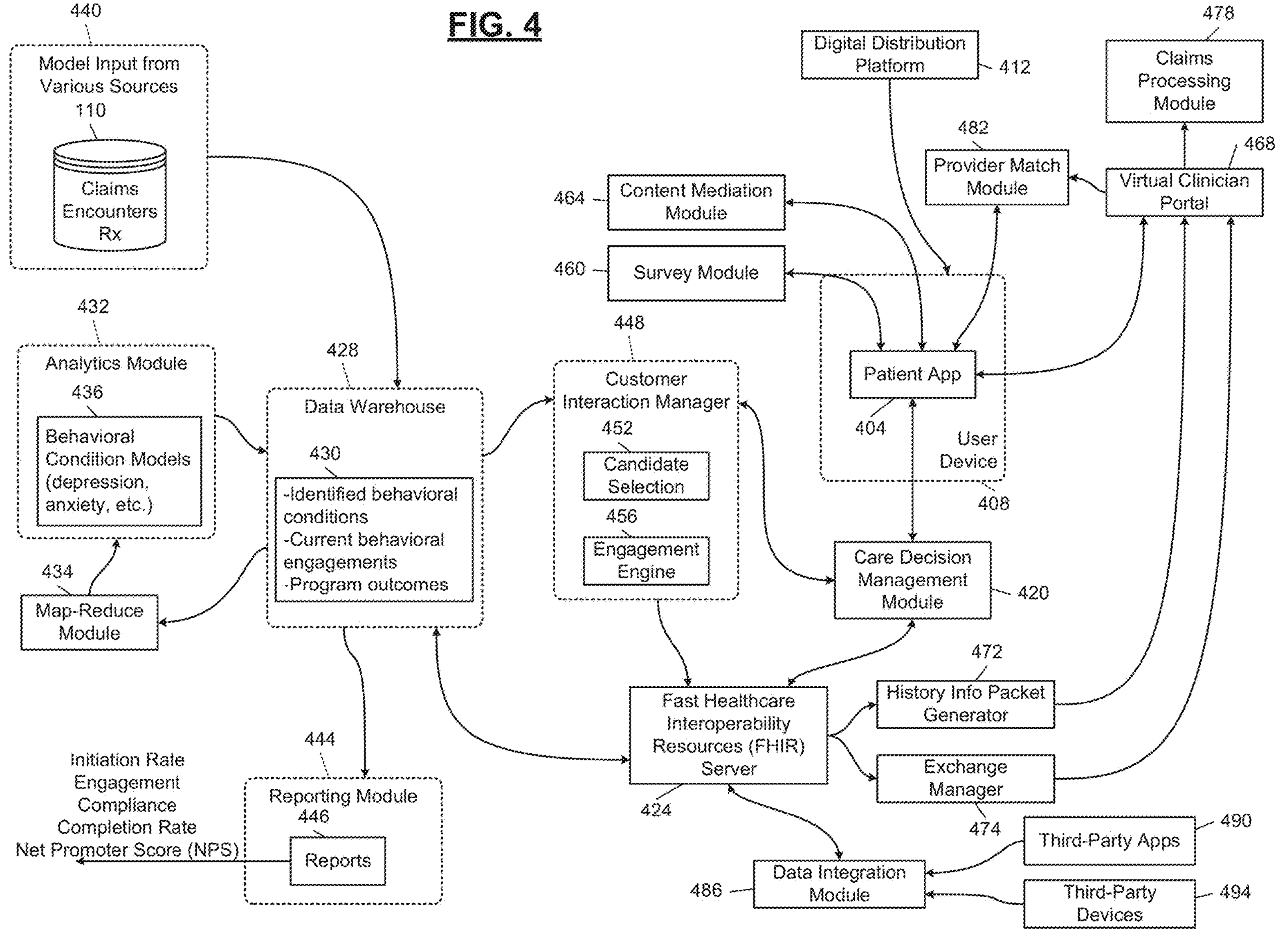
FIG. 4
440
Model Input from Various Sources
110
Claims
Encounters
Rx
432
Analytics Module
436
Behavioral Condition Models (depression, anxiety, etc.)
434
Map-Reduce Module
428
Data Warehouse
430
-Identified behavioral conditions
-Current behavioral engagements
-Program outcomes
444
Reporting Module
446
Reports
Initiation Rate
Engagement
Compliance
Completion Rate
Net Promoter Score (NPS)
448
Customer Interaction Manager
452
Candidate Selection
456
Engagement Engine
464
Content Mediation Module
460
Survey Module
424
Fast Healthcare Interoperability Resources (FHIR) Server
486
Data Integration Module
420
Care Decision Management Module
404
Patient App
408
User Device
412
Digital Distribution Platform
482
Provider Match Module
468
Virtual Clinician Portal
478
Claims Processing Module
472
History Info Packet Generator
474
Exchange Manager
490
Third-Party Apps
494
Third-Party Devices

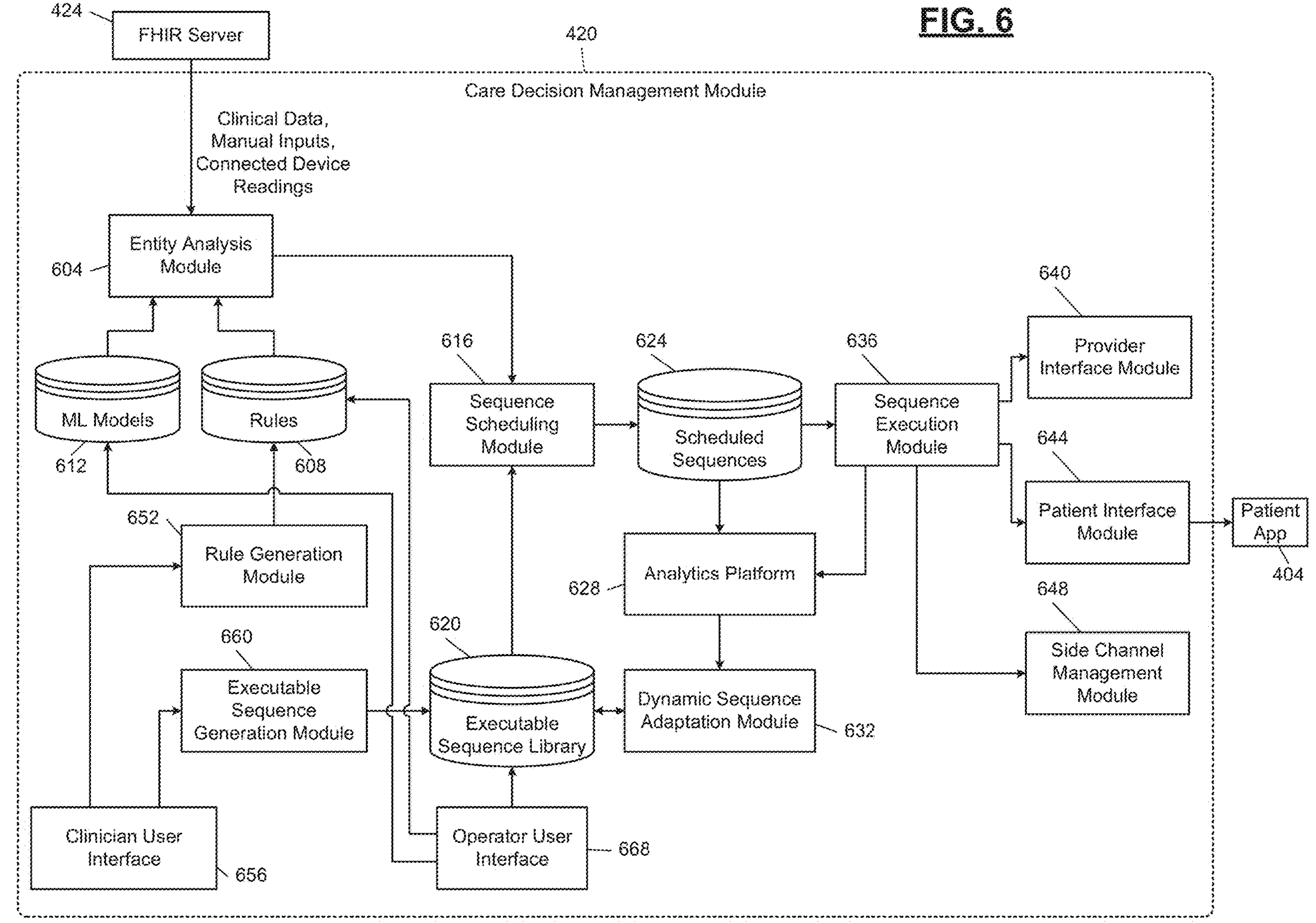
FIG. 6
424
FHIR Server
420
Care Decision Management Module
Clinical Data, Manual Inputs, Connected Device Readings
604
Entity Analysis Module
ML Models
612
Rules
608
652
Rule Generation Module
660
Executable Sequence Generation Module
Clinician User Interface
656
616
Sequence Scheduling Module
620
Executable Sequence Library
Operator User Interface
668
624
Scheduled Sequences
628
Analytics Platform
Dynamic Sequence Adaptation Module
632
636
Sequence Execution Module
640
Provider Interface Module
644
Patient Interface Module
648
Side Channel Management Module
Patient App
404

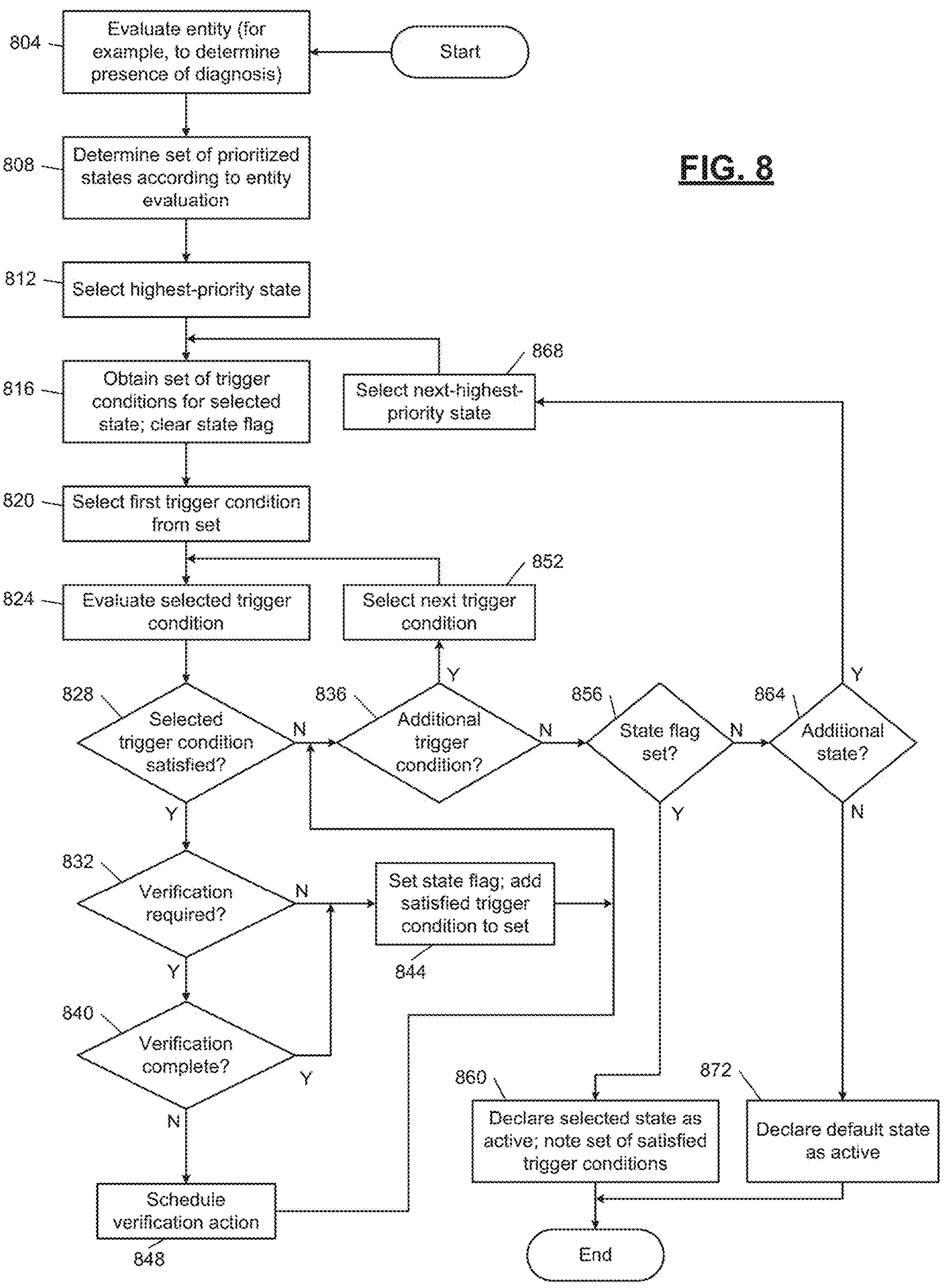
FIG. 8
Start
804
Evaluate entity (for example, to determine presence of diagnosis)
808
Determine set of prioritized states according to entity evaluation
812
Select highest-priority state
816
Obtain set of trigger conditions for selected state; clear state flag
868
Select next-highest-priority state
820
Select first trigger condition from set
824
Evaluate selected trigger condition
852
Select next trigger condition
828
Selected trigger condition satisfied?
836
Additional trigger condition?
856
State flag set?
864
Additional state?
Y
N
832
Verification required?
Set state flag; add satisfied trigger condition to set
844
840
Verification complete?
860
Declare selected state as active; note set of satisfied trigger conditions
872
Declare default state as active
Schedule verification action
848
End

MACHINE LEARNING MODELS FOR GENERATING EXECUTABLE SEQUENCES

CROSS-REFERENCE TO RELATED APPLICATIONS

This application claims the benefit of U.S. Provisional Application No. 63/348,433 filed Jun. 2, 2022, the entire disclosure of which is incorporated by reference.

FIELD

The present disclosure relates to automated execution of executable sequences and more particularly to machine learning models and rule sets for selecting and adapting executable sequences.

SUMMARY

A system includes memory hardware configured to store instructions and a data store. The system includes processor hardware configured to execute the instructions. The instructions include, in response to designation of an entity within a data store, obtaining information corresponding to the designated entity from the data store and determining a condition of the designated entity based on the obtained information. The instructions include, based on the condition of the designated entity, identifying a set of states and selecting a state from the set of states. The instructions include obtaining a set of trigger conditions for the selected state. Each trigger condition of the set of trigger conditions specifies a set of satisfaction criteria. The instructions include, for each trigger condition of the set of trigger conditions, determining whether the trigger condition is satisfied by evaluating the satisfaction criteria of the trigger condition based on data corresponding to the designated entity. The instructions include selectively selecting another state from the set of states based on whether the trigger conditions of the set of trigger conditions are satisfied. The instructions include determining an executable sequence based on the selected state. The instructions include scheduling the executable sequence for execution.

In other features, the selecting another state is performed in response to none one of the set of trigger conditions being satisfied. In other features, the selecting another state is performed in response to at least one of the set of trigger conditions failing to be satisfied. In other features, the selecting another state is performed in response to a defined profile of the set of trigger conditions failing to be satisfied. In other features, verification is selectively specified for a trigger condition of the set of trigger conditions. In response to verification being specified for the trigger condition, the trigger condition is determined to be satisfied only in response to successful verification of the satisfaction criteria of the trigger condition.

In other features, the successful verification requires that the satisfaction criteria of the trigger condition be satisfied multiple times. In other features, the successful verification requires that the satisfaction criteria of the trigger condition be satisfied multiple times in greater than a specified time window. In other features, the specified time window is 24 hours. In other features, the executable sequence selectively includes transmitting a message soliciting data acquisition to a person corresponding to the designated entity. In other features, the transmitting specifies a communications channel selected from a plurality of specified communication channels.

In other features, the transmitting includes transmitting a message to the person via a data acquisition device located at a residence of the person. In other features, the determining the executable sequence includes at least one of selecting the executable sequence from a data structure storing a plurality of executable sequences; or generating the executable sequence. In other features, the generating the executable sequence includes incorporating sequence elements based on input from a clinician user interface. In other features, the executable sequence selectively includes scheduling a point-to-point communication with a person corresponding to the designated entity.

In other features, the data corresponding to the designated entity is based on electronic health records. In other features, the data store includes a relational database. In other features, each state of the set of states is associated with a priority; the selecting initially selects a highest priority one of the set of states. In other features, the states include an escalation state, an intervention state, and a normal state. A priority of the escalation state is higher than a priority of the intervention state. The priority of the intervention state is higher than a priority of the normal state.

A computerized method includes, in response to designation of an entity within a data store, obtaining information corresponding to the designated entity from the data store and determining a condition of the designated entity based on the obtained information. The method includes, based on the condition of the designated entity, identifying a set of states and selecting a state from the set of states. The method includes obtaining a set of trigger conditions for the selected state. Each trigger condition of the set of trigger conditions specifies a set of satisfaction criteria. The method includes, for each trigger condition of the set of trigger conditions, determining whether the trigger condition is satisfied by evaluating the satisfaction criteria of the trigger condition based on data corresponding to the designated entity. The method includes selectively selecting another state from the set of states based on whether the trigger conditions of the set of trigger conditions are satisfied. The method includes determining an executable sequence based on the selected state. The method includes scheduling the executable sequence for execution. In other features, the selecting another state is performed in response to none one of the set of trigger conditions being satisfied.

A non-transitory computer-readable medium includes processor-executable instructions. The instructions include, in response to designation of an entity within a data store, obtaining information corresponding to the designated entity from the data store and determining a condition of the designated entity based on the obtained information. The instructions include, based on the condition of the designated entity, identifying a set of states and selecting a state from the set of states. The instructions include obtaining a set of trigger conditions for the selected state. Each trigger condition of the set of trigger conditions specifies a set of satisfaction criteria. The instructions include, for each trigger condition of the set of trigger conditions, determining whether the trigger condition is satisfied by evaluating the satisfaction criteria of the trigger condition based on data corresponding to the designated entity. The instructions include selectively selecting another state from the set of states based on whether the trigger conditions of the set of trigger conditions are satisfied. The instructions include determining an executable sequence based on the selected state. The instructions include scheduling the executable sequence for execution. In other features, the selecting another state is performed in response to none one of the set of trigger conditions being satisfied.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 3 is a functional block diagram of an example order processing device, which may be deployed within the system of FIG. 1.

FIG. 4 is a functional block diagram of an example architecture for system according to the principles of the present disclosure.

FIG. 6 is a functional block diagram of an example implementation of a care decision management module.

FIG. 8 is a flowchart of example state determination of an entity for use in selecting an executable sequence.

In the drawings, reference numbers may be reused to identify similar and/or identical elements.

DETAILED DESCRIPTION

Introduction

Figure 1:
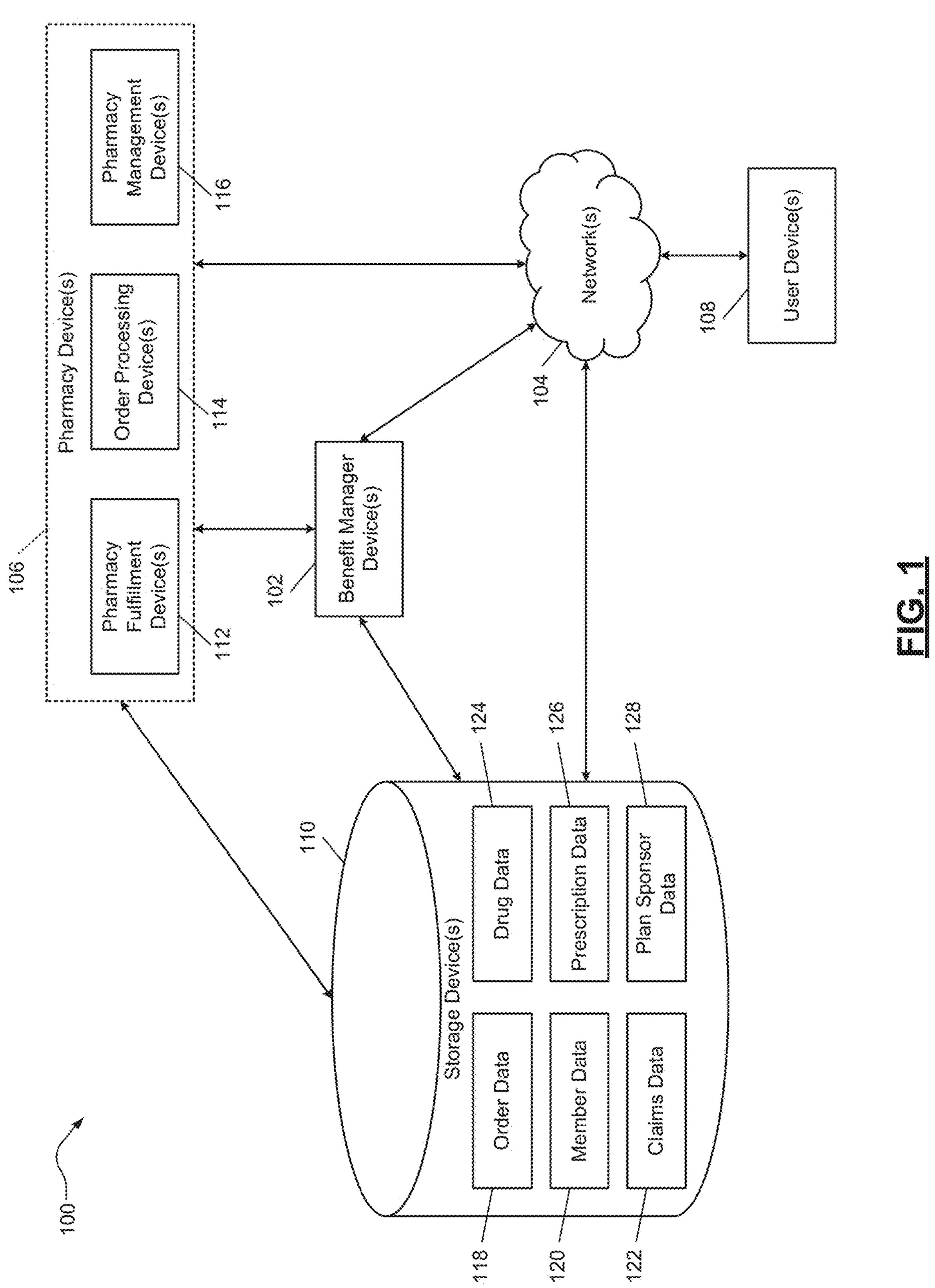
FIG. 1 is a functional block diagram of an example system including a high-volume pharmacy.

The present disclosure describes a system for programmatically determining and executing executable action sequences. These action sequences may include specific timing components and triggers. For example, an action sequence may include obtaining a reading at a specified interval. An action sequence may also include checking for whether a reading has been provided at a certain interval. An action sequence may also include adding an entry to a queue corresponding to a certain communication channel. In various implementations, there may be multiple channels using a shared queue or multiple channels using multiple queues (for example, one queue for every communications channel).

Each queue may be processed programmatically and may include automated communications via a certain channel. For example, a channel may include email, text message, over-the-top messaging, prerecorded calls, etc. In various implementations, the queue may be processed by setting up a connection between a person and the communication recipient. For example, this connection setup may include a phone call, a live chat, a non-real-time chat (such as via email exchange or in-app messaging).

In various implementations, the present disclosure may be used in a healthcare context, where the communication recipient may be referred to as a patient. In such an example, the person being programmatically connected to the patient may be a clinician or support specialist. A clinician may include a doctor, a physician assistant, a pharmacist, a pharmacy technician, a nurse practitioner, a nurse, etc. Actions within an executable sequence for the healthcare context may include taking a reading—such as measuring pulse, measuring blood pressure, measuring weight—or manual entry, such as a food log. Other actions may include performing exercise, scheduling clinician visits, refilling prescriptions, etc. Actions may include interacting with a healthcare provider, such as via a website or an application running on a user device (such as a smartphone).

The system may obtain information about the user from existing records, such as prescription, medical, and lab records. In addition, the system may have an onboarding flow for gathering information from the user. The onboarding flow may be executed within an app installed on a user device. Frequent, such as daily, interaction with the system may allow the system to more accurately select and adapt action sequences for that user.

As one simplified example, a set of executable sequences may be defined with respect to congestive heart failure (CHF). Some elements of the set may be relevant to a user who has not been diagnosed with CHF while another subset may be applicable to a user who has been diagnosed with CHF. In various implementations, these subsets may be non-overlapping. To continue with the specific example, three executable sequences may correspond to a stable state, an intervention state, and an escalation state, respectively, of a pre-diagnosis user.

A set of trigger conditions may correspond to the escalation state and another set of trigger conditions may correspond to the intervention state. The escalation state may take precedence over the intervention state such that, regardless of whether the trigger conditions for the intervention state are met, the escalation state is chosen if the trigger conditions for the escalations state are met. The escalation state corresponds to a particular executable action sequence. Actions within the executable sequence may include rewards, such as digital currency within an app or other rewards that gamify the user experience, such as progress towards badges, levels, etc. The intervention state corresponds to a different executable action sequence, which may share some of the actions of the executable action sequence of the escalation state. Similarly, the stable state corresponds to yet another executable action sequence, which may share some of the actions of the executable action sequences of the escalation or intervention states.

As a specific example, a trigger condition for the escalation state may include blood pressure readings greater than 160/100 for two consecutive days. Another trigger condition for the escalation state is a hemoglobin A1C (HbA1c) of greater than 9. Another trigger condition is an electrocardiogram (EKG) measurement indicating an irregular heartbeat. In various implementations, any of these trigger conditions may result in the escalation state being chosen. In various other implementations, the conditions may be selected in such that two or more are required for selecting the escalation state. In other implementations, a cumulative score may be calculated based on weighting the trigger conditions and setting a threshold for the score.

In various implementations, certain verification conditions may be present for a trigger. For example, a high blood pressure trigger may require measurements on consecutive days to account for noisy or inaccurate readings. The verification conditions may be adapted to each user specifically—for example, another user may have verification requirements that two high blood pressure measurements are sufficient to satisfy a trigger condition even if they are not separated by a day.

Continuing the example, the intervention state may be triggered by a blood pressure greater than 120/80 that occurs twice within a 2-week period. Another trigger condition for the intervention pathway state may be a cumulative aerobic activity below a threshold number of minutes (such as 150) in the proceeding seven days or the preceding calendar week. Another trigger condition may be a BMI of greater than a threshold (such as 25). Another trigger condition may be a sodium intake (which might be self-reported and/or derived based on data such as a food log) greater than the threshold. For example, the threshold may be 2300 mg in the prior 24 hours or in the prior calendar day or in the current calendar day. Another trigger condition may be an HbA1c of greater than 5.6. Another trigger condition may be a low-density lipoprotein (LDL) of greater than a threshold, such as 100. Another trigger condition may be a high-density lipoprotein (HDL) of less than a threshold, such as 40.

Continuing the example, another set of stable intervention and escalation states may be defined for a user who has been diagnosed with CHF. In this example, the post-diagnosis escalation state has been defined to take precedence over the post-diagnosis intervention state, which is itself defined to take precedence over the post-diagnosis stable state. Trigger conditions for the escalation state (for a post-CHF-diagnosis user) may include a blood pressure of greater than a threshold, such as 170/100. Another trigger condition for the escalation state is a pulse greater than a threshold, such as 120 beats per minute (bpm). Another trigger condition for the escalation state is a weight gain of more than a threshold, such as three pounds, in a 24-hour period. Another trigger condition for the escalation state is moderate to severe leg swelling. Another trigger condition for the escalation state is shortness of breath at rest.

Trigger conditions for the intervention state (for a post-CHF-diagnosis user) may include a blood pressure of more than 130/80. Another trigger condition is a pulse greater than a threshold, such as 100 bpm. Another set of trigger conditions for the intervention state may be a weight gain of more than a first threshold, such as two pounds, within a 24-hour period or a weight gain of more than a second threshold, such as 5 pounds, within a one-week period. Another trigger condition for the intervention state may be mild leg swelling. Another trigger condition for the intervention state may be shortness of breath during activity. Another trigger condition for the intervention state may be a sodium intake of more than a threshold, such as 2300 mg, within a predetermined period of time, such as one day.

In various implementations, a monitoring state may be defined, which corresponds to an executable action sequence that includes more frequent monitoring. This state may be selected in order to more quickly make a conclusive determination of whether a higher-priority state (such as the escalation state) should be selected.

The trigger conditions and corresponding states may be described by a clinician in a tabular format and/or may be translated into a tabular format based on input from a clinician. In various implementations, a graphical user interface may allow an operator or a clinician to directly configure trigger conditions, including thresholds, verification requirements, and combination requirements.

For example, verification requirements may be implemented for readings that have known variability. In such cases, a single reading may need to be verified before a change in state occurs. In various implementations, the verification may be required when moving to a higher priority state only, when moving to a lower priority state only, or when changing state in either direction. Combination requirements mean that, in some cases, multiple trigger conditions must be satisfied in order to select a state rather than only a single trigger condition being satisfied.

A system according to the present disclosure may obtain data from not just standard electronic health records (EHRs) and electronic medical records (EMRs) but also from direct user interaction (such as with an app or website) and with connected devices. For example, connected devices may include a smartwatch that measures oxygen level, heart rate, and activity (including minutes of activity, step count, etc.), smart scales, network-connected blood pressure cuffs, etc. User interactions with an application, whether on the user's device or through a website, may include self-reported items related to physical, mental, and emotional health. The user may also supply information regarding activity, eating habits, etc.

The system may therefore be able to select and/or adapt an executable action sequence with far greater granularity and more responsively than any conditional approach. Further, the executable action sequence is executed autonomously so that a closed-loop system involving the user has a much faster cycle time than any traditional approach. In the medical context, this closed-loop autonomous system may have faster feedback performance even than if the user has a personal doctor who the user is visiting with daily.

The system may include a dashboard for the user that is personalized, meaning that a user interface is transformed according to, for example, enrollment criteria, plan structure, active executable action sequences, and user-expressed preferences. The repeated monitoring of the user may be synchronized to clinician systems for use when clinician contact is initiated. The executable action sequence may include reminders and prompts for regular, recurring, or periodic virtual or in-person visits with a clinician, and may track both user and clinician notes on prior visits.

Some executable action sequences may include immediate actions that can be communicate with the user, the system operator, and/or the clinician (for example, virtual care, in-person care, lab-based care, and/or emergency services). An executable action sequence may include reward paths and related experiences representing component opportunities, such as celebration, discounts, or direct service access. The system may also analyze outcomes for the user, the system operator, and related parties, such as benefit plans, human resources departments, etc. The analysis may provide information regarding monetary or other savings based on increased wellness as well as providing metrics describing wellness, such as disease prevention, adherence (to prescriptions and/or to other guidance from conditions), and positive behavioral patterns.

The system may automate the connection of internet of things (IoT) devices to an environment including the system. For example, the system may provide detailed instructions regarding connecting a smart scale to Wi-Fi and establishing a data connection of scale readings (e.g., weight, fat percentage, etc.) to the system. An onboarding process may gather information about the user, which then serves as a baseline. For example, an initial mindset score may be determined based on user interactions and variations from that baseline may be monitored over time. Monitoring over time may involve readings as well as inputs such as ongoing surveys.

The system may provide a provider match functionality that allows a user to be matched with a clinician. This match may be informed by enrollment criteria and preferences expressed by the user both explicitly and implicitly. The provider match may consider clinical expertise, insurance considerations, and clinician preferences.

In various implementations, benefits to the user, the system operator, and related parties (such as health plans). These benefits may include a reduced time to care (compared to a traditional delay, which some estimates put at 58 days), more regular engagement on health, increased user trust, perception of improvement and progress (mood improvement, fewer episodes, greater medication adherence or adjustment, better focus, increases in productivity), reduced health care costs overall, increased satisfaction and loyalty of clinicians, greater efficiency in allocation of resources, etc.

High-Volume Pharmacy

FIG. 1 is a block diagram of an example implementation of a system 100 for a high-volume pharmacy. While the system 100 is generally described as being deployed in a high-volume pharmacy or a fulfillment center (for example, a mail order pharmacy, a direct delivery pharmacy, etc.), the system 100 and/or components of the system 100 may otherwise be deployed (for example, in a lower-volume pharmacy, etc.). A high-volume pharmacy may be a pharmacy that is capable of filling at least some prescriptions mechanically. The system 100 may include a benefit manager device 102 and a pharmacy device 106 in communication with each other directly and/or over a network 104.

The system 100 may also include one or more user device(s) 108. A user, such as a pharmacist, patient, data analyst, health plan administrator, etc., may access the benefit manager device 102 or the pharmacy device 106 using the user device 108. The user device 108 may be a desktop computer, a laptop computer, a tablet, a smartphone, etc.

The benefit manager device 102 is a device operated by an entity that is at least partially responsible for creation and/or management of the pharmacy or drug benefit. While the entity operating the benefit manager device 102 is typically a pharmacy benefit manager (PBM), other entities may operate the benefit manager device 102 on behalf of themselves or other entities (such as PBMs). For example, the benefit manager device 102 may be operated by a health plan, a retail pharmacy chain, a drug wholesaler, a data analytics or other type of software-related company, etc. In some implementations, a PBM that provides the pharmacy benefit may provide one or more additional benefits including a medical or health benefit, a dental benefit, a vision benefit, a wellness benefit, a radiology benefit, a pet care benefit, an insurance benefit, a long term care benefit, a nursing home benefit, etc. The PBM may, in addition to its PBM operations, operate one or more pharmacies. The pharmacies may be retail pharmacies, mail order pharmacies, etc.

Some of the operations of the PBM that operates the benefit manager device 102 may include the following activities and processes. A member (or a person on behalf of the member) of a pharmacy benefit plan may obtain a prescription drug at a retail pharmacy location (e.g., a location of a physical store) from a pharmacist or a pharmacist technician. The member may also obtain the prescription drug through mail order drug delivery from a mail order pharmacy location, such as the system 100. In some implementations, the member may obtain the prescription drug directly or indirectly through the use of a machine, such as a kiosk, a vending unit, a mobile electronic device, or a different type of mechanical device, electrical device, electronic communication device, and/or computing device. Such a machine may be filled with the prescription drug in prescription packaging, which may include multiple prescription components, by the system 100. The pharmacy benefit plan is administered by or through the benefit manager device 102.

The member may have a copayment for the prescription drug that reflects an amount of money that the member is responsible to pay the pharmacy for the prescription drug. The money paid by the member to the pharmacy may come from, as examples, personal funds of the member, a health savings account (HSA) of the member or the member's family, a health reimbursement arrangement (HRA) of the member or the member's family, or a flexible spending account (FSA) of the member or the member's family. In some instances, an employer of the member may directly or indirectly fund or reimburse the member for the copayments.

The amount of the copayment required by the member may vary across different pharmacy benefit plans having different plan sponsors or clients and/or for different prescription drugs. The member's copayment may be a flat copayment (in one example, $10), coinsurance (in one example, 10%), and/or a deductible (for example, responsibility for the first $500 of annual prescription drug expense, etc.) for certain prescription drugs, certain types and/or classes of prescription drugs, and/or all prescription drugs. The copayment may be stored in a storage device 110 or determined by the benefit manager device 102.

In some instances, the member may not pay the copayment or may only pay a portion of the copayment for the prescription drug. For example, if a usual and customary cost for a generic version of a prescription drug is $4, and the member's flat copayment is $20 for the prescription drug, the member may only need to pay $4 to receive the prescription drug. In another example involving a worker's compensation claim, no copayment may be due by the member for the prescription drug.

In addition, copayments may also vary based on different delivery channels for the prescription drug. For example, the copayment for receiving the prescription drug from a mail order pharmacy location may be less than the copayment for receiving the prescription drug from a retail pharmacy location.

In conjunction with receiving a copayment (if any) from the member and dispensing the prescription drug to the member, the pharmacy submits a claim to the PBM for the prescription drug. After receiving the claim, the PBM (such as by using the benefit manager device 102) may perform certain adjudication operations including verifying eligibility for the member, identifying/reviewing an applicable formulary for the member to determine any appropriate copayment, coinsurance, and deductible for the prescription drug, and performing a drug utilization review (DUR) for the member. Further, the PBM may provide a response to the pharmacy (for example, the pharmacy system 100) following performance of at least some of the aforementioned operations.

As part of the adjudication, a plan sponsor (or the PBM on behalf of the plan sponsor) ultimately reimburses the pharmacy for filling the prescription drug when the prescription drug was successfully adjudicated. The aforementioned adjudication operations generally occur before the copayment is received and the prescription drug is dispensed. However in some instances, these operations may occur simultaneously, substantially simultaneously, or in a different order. In addition, more or fewer adjudication operations may be performed as at least part of the adjudication process.

The amount of reimbursement paid to the pharmacy by a plan sponsor and/or money paid by the member may be determined at least partially based on types of pharmacy networks in which the pharmacy is included. In some implementations, the amount may also be determined based on other factors. For example, if the member pays the pharmacy for the prescription drug without using the prescription or drug benefit provided by the PBM, the amount of money paid by the member may be higher than when the member uses the prescription or drug benefit. In some implementations, the amount of money received by the pharmacy for dispensing the prescription drug and for the prescription drug itself may be higher than when the member uses the prescription or drug benefit. Some or all of the foregoing operations may be performed by executing instructions stored in the benefit manager device 102 and/or an additional device.

Examples of the network 104 include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network 104 may include an optical network. The network 104 may be a local area network or a global communication network, such as the Internet. In some implementations, the network 104 may include a network dedicated to prescription orders: a prescribing network such as the electronic prescribing network operated by Surescripts of Arlington, Virginia.

Moreover, although the system shows a single network 104, multiple networks can be used. The multiple networks may communicate in series and/or parallel with each other to link the devices 102-110.

The pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use the pharmacy device 106 to submit the claim to the PBM for adjudication.

Additionally, in some implementations, the pharmacy device 106 may enable information exchange between the pharmacy and the PBM. For example, this may allow the sharing of member information such as drug history that may allow the pharmacy to better service a member (for example, by providing more informed therapy consultation and drug interaction information). In some implementations, the benefit manager device 102 may track prescription drug fulfillment and/or other information for users that are not members, or have not identified themselves as members, at the time (or in conjunction with the time) in which they seek to have a prescription filled at a pharmacy.

The pharmacy device 106 may include a pharmacy fulfillment device 112, an order processing device 114, and a pharmacy management device 116 in communication with each other directly and/or over the network 104. The order processing device 114 may receive information regarding filling prescriptions and may direct an order component to one or more devices of the pharmacy fulfillment device 112 at a pharmacy. The pharmacy fulfillment device 112 may fulfill, dispense, aggregate, and/or pack the order components of the prescription drugs in accordance with one or more prescription orders directed by the order processing device 114.

In general, the order processing device 114 is a device located within or otherwise associated with the pharmacy to enable the pharmacy fulfillment device 112 to fulfill a prescription and dispense prescription drugs. In some implementations, the order processing device 114 may be an external order processing device separate from the pharmacy and in communication with other devices located within the pharmacy.

For example, the external order processing device may communicate with an internal pharmacy order processing device and/or other devices located within the system 100. In some implementations, the external order processing device may have limited functionality (e.g., as operated by a user requesting fulfillment of a prescription drug), while the internal pharmacy order processing device may have greater functionality (e.g., as operated by a pharmacist).

The order processing device 114 may track the prescription order as it is fulfilled by the pharmacy fulfillment device 112. The prescription order may include one or more prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order. The order consolidation decisions include whether portions of one prescription order or multiple prescription orders should be shipped together for a user or a user family. The order processing device 114 may also track and/or schedule literature or paperwork associated with each prescription order or multiple prescription orders that are being shipped together. In some implementations, the order processing device 114 may operate in combination with the pharmacy management device 116.

The order processing device 114 may include circuitry, a processor, a memory to store data and instructions, and communication functionality. The order processing device 114 is dedicated to performing processes, methods, and/or instructions described in this application. Other types of electronic devices may also be used that are specifically configured to implement the processes, methods, and/or instructions described in further detail below.

In some implementations, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (for example, such as by using a local storage) and/or through the network 104 (such as by using a cloud storage configuration, software as a service, etc.) with the storage device 110.

The storage device 110 may include: non-transitory storage (for example, memory, hard disk, CD-ROM, etc.) in communication with the benefit manager device 102 and/or the pharmacy device 106 directly and/or over the network 104. The non-transitory storage may store order data 118, member data 120, claims data 122, drug data 124, prescription data 126, and/or plan sponsor data 128. Further, the system 100 may include additional devices, which may communicate with each other directly or over the network 104.

The order data 118 may be related to a prescription order. The order data may include type of the prescription drug (for example, drug name and strength) and quantity of the prescription drug. The order data 118 may also include data used for completion of the prescription, such as prescription materials. In general, prescription materials include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, etc. The order data 118 may be used by a high-volume fulfillment center to fulfill a pharmacy order.

In some implementations, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (for example, a prescription container and sealing lid, prescription packaging, etc.) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information such as barcode data read from pallets, bins, trays, or carts used to transport prescriptions within the pharmacy may also be stored as order data 118.

The member data 120 includes information regarding the members associated with the PBM. The information stored as member data 120 may include personal information, personal health information, protected health information, etc. Examples of the member data 120 include name, age, date of birth, address (including city, state, and zip code), telephone number, e-mail address, medical history, prescription drug history, etc. In various implementations, the prescription drug history may include a prior authorization claim history—including the total number of prior authorization claims, approved prior authorization claims, and denied prior authorization claims. In various implementations, the prescription drug history may include previously filled claims for the member, including a date of each filled claim, a dosage of each filled claim, the drug type for each filled claim, a prescriber associated with each filled claim, and whether the drug associated with each claim is on a formulary (e.g., a list of covered medication).

In various implementations, the medical history may include whether and/or how well each member adhered to one or more specific therapies. The member data 120 may also include a plan sponsor identifier that identifies the plan sponsor associated with the member and/or a member identifier that identifies the member to the plan sponsor. The member data 120 may include a member identifier that identifies the plan sponsor associated with the user and/or a user identifier that identifies the user to the plan sponsor. In various implementations, the member data 120 may include an eligibility period for each member. For example, the eligibility period may include how long each member is eligible for coverage under the sponsored plan. The member data 120 may also include dispensation preferences such as type of label, type of cap, message preferences, language preferences, etc.

The member data 120 may be accessed by various devices in the pharmacy (for example, the high-volume fulfillment center, etc.) to obtain information used for fulfillment and shipping of prescription orders. In some implementations, an external order processing device operated by or on behalf of a member may have access to at least a portion of the member data 120 for review, verification, or other purposes.

In some implementations, the member data 120 may include information for persons who are users of the pharmacy but are not members in the pharmacy benefit plan being provided by the PBM. For example, these users may obtain drugs directly from the pharmacy, through a private label service offered by the pharmacy, the high-volume fulfillment center, or otherwise. In general, the terms "member" and "user" may be used interchangeably.

The claims data 122 includes information regarding pharmacy claims adjudicated by the PBM under a drug benefit program provided by the PBM for one or more plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic product identifier (GPI) number, medication class, the cost of the prescription drug provided under the drug benefit program, the copayment/coinsurance amount, rebate information, and/or member eligibility, etc. Additional information may be included.

In some implementations, other types of claims beyond prescription drug claims may be stored in the claims data 122. For example, medical claims, dental claims, wellness claims, or other types of health-care-related claims for members may be stored as a portion of the claims data 122.

In some implementations, the claims data 122 includes claims that identify the members with whom the claims are associated. Additionally or alternatively, the claims data 122 may include claims that have been de-identified (that is, associated with a unique identifier but not with a particular, identifiable member). In various implementations, the claims data 122 may include a percentage of prior authorization cases for each prescriber that have been denied, and a percentage of prior authorization cases for each prescriber that have been approved.

The drug data 124 may include drug name (e.g., technical name and/or common name), other names by which the drug is known, active ingredients, an image of the drug (such as in pill form), etc. The drug data 124 may include information associated with a single medication or multiple medications. For example, the drug data 124 may include a numerical identifier for each drug, such as the U.S. Food and Drug Administration's (FDA) National Drug Code (NDC) for each drug.

The prescription data 126 may include information regarding prescriptions that may be issued by prescribers on behalf of users, who may be members of the pharmacy benefit plan—for example, to be filled by a pharmacy. Examples of the prescription data 126 include user names, medication or treatment (such as lab tests), dosing information, etc. The prescriptions may include electronic prescriptions or paper prescriptions that have been scanned. In some implementations, the dosing information reflects a frequency of use (e.g., once a day, twice a day, before each meal, etc.) and a duration of use (e.g., a few days, a week, a few weeks, a month, etc.).

In some implementations, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, etc.

Figure 2:
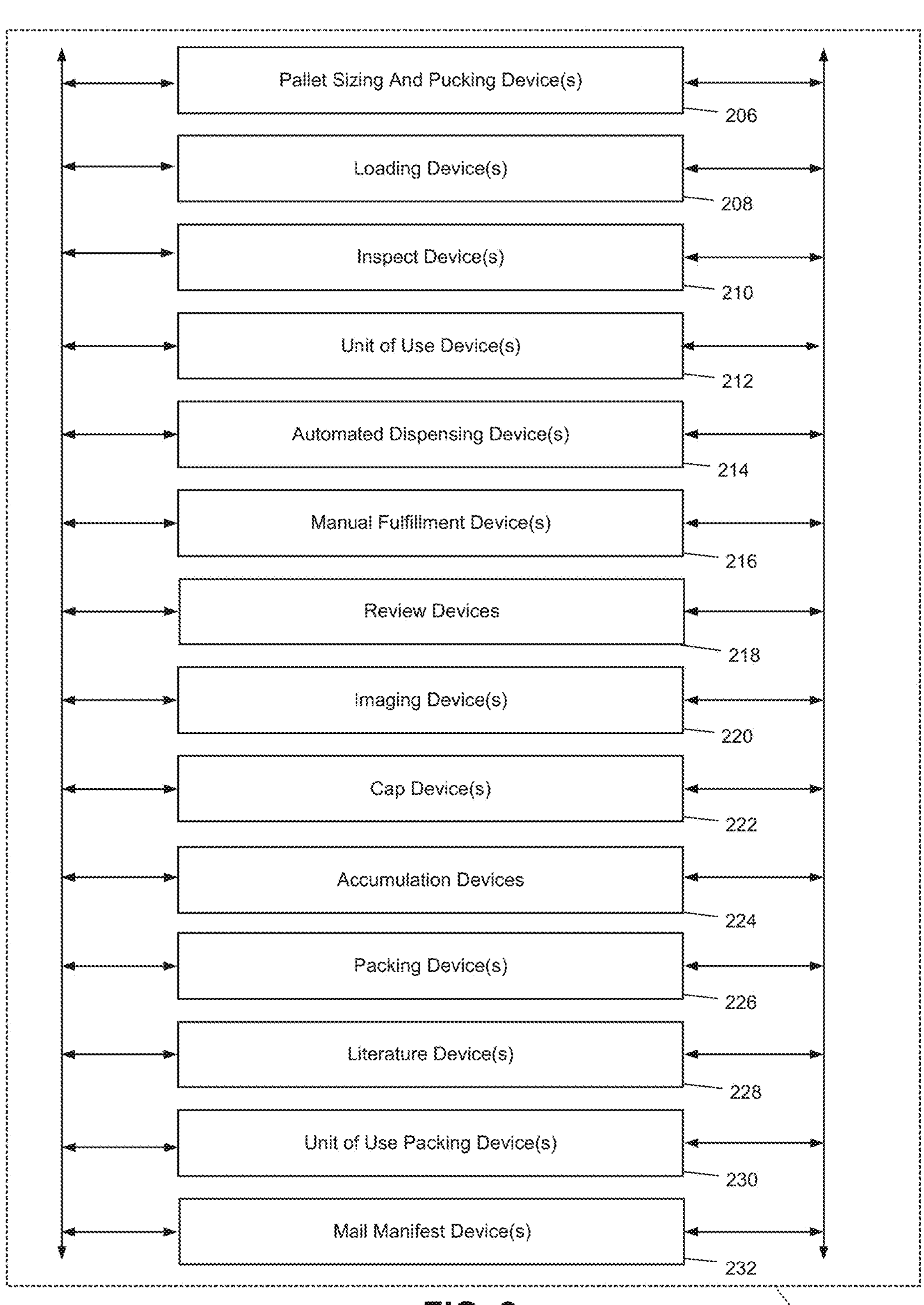
FIG. 2 is a functional block diagram of an example pharmacy fulfillment device, which may be deployed within the system of FIG. 1.

FIG. 2 illustrates the pharmacy fulfillment device 112 according to an example implementation. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device 102, the order processing device 114, and/or the storage device 110, directly or over the network 104. Specifically, the pharmacy fulfillment device 112 may include pallet sizing and pucking device(s) 206, loading device(s) 208, inspect device(s) 210, unit of use device(s) 212, automated dispensing device(s) 214, manual fulfillment device(s) 216, review devices 218, imaging device(s) 220, cap device(s) 222, accumulation devices 224, packing device(s) 226, literature device(s) 228, unit of use packing device(s) 230, and mail manifest device(s) 232. Further, the pharmacy fulfillment device 112 may include additional devices, which may communicate with each other directly or over the network 104.

In some implementations, operations performed by one of these devices 206-232 may be performed sequentially, or in parallel with the operations of another device as may be coordinated by the order processing device 114. In some implementations, the order processing device 114 tracks a prescription with the pharmacy based on operations performed by one or more of the devices 206-232.

In some implementations, the pharmacy fulfillment device 112 may transport prescription drug containers, for example, among the devices 206-232 in the high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism (also referred to as pickers), etc. In various implementations, the loading device 208 has robotic arms or pickers to grasp a prescription container and move it to and from a pallet or a puck. The loading device 208 may also print a label that is appropriate for a container that is to be loaded onto the pallet, and apply the label to the container. The pallet may be located on a conveyor assembly during these operations (e.g., at the high-volume fulfillment center, etc.).

The inspect device 210 may verify that containers in a pallet are correctly labeled and in the correct spot on the pallet. The inspect device 210 may scan the label on one or more containers on the pallet. Labels of containers may be scanned or imaged in full or in part by the inspect device 210. Such imaging may occur after the container has been lifted out of its puck by a robotic arm, picker, etc., or may be otherwise scanned or imaged while retained in the puck. In some implementations, images and/or video captured by the inspect device 210 may be stored in the storage device 110 as order data 118.

The unit of use device 212 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, etc. Prescription drug products dispensed by the unit of use device 212 may be packaged individually or collectively for shipping, or may be shipped in combination with other prescription drugs dispensed by other devices in the high-volume fulfillment center.

At least some of the operations of the devices 206-232 may be directed by the order processing device 114. For example, the manual fulfillment device 216, the review device 218, the automated dispensing device 214, and/or the packing device 226, etc. may receive instructions provided by the order processing device 114.

The automated dispensing device 214 may include one or more devices that dispense prescription drugs or pharmaceuticals into prescription containers in accordance with one or multiple prescription orders. In general, the automated dispensing device 214 may include mechanical and electronic components with, in some implementations, software and/or logic to facilitate pharmaceutical dispensing that would otherwise be performed in a manual fashion by a pharmacist and/or pharmacist technician. For example, the automated dispensing device 214 may include high-volume fillers that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high-volume fulfillment center.

The manual fulfillment device 216 controls how prescriptions are manually fulfilled. For example, the manual fulfillment device 216 may receive or obtain a container and enable fulfillment of the container by a pharmacist or pharmacy technician. In some implementations, the manual fulfillment device 216 provides the filled container to another device in the pharmacy fulfillment devices 112 to be joined with other containers in a prescription order for a user or member.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. Some portions of the manual fulfillment process may be automated by use of a machine. For example, counting of capsules, tablets, or pills may be at least partially automated (such as through use of a pill counter). Prescription drugs dispensed by the manual fulfillment device 216 may be packaged individually or collectively for shipping, or may be shipped in combination with other prescription drugs dispensed by other devices in the high-volume fulfillment center.

The review device 218 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review can be performed at a manual review station.

The imaging device 220 may image containers once they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114 and/or stored in the storage device 110 as part of the order data 118.

The cap device 222 may be used to cap or otherwise seal a prescription container. In some implementations, the cap device 222 may secure a prescription container with a type of cap in accordance with a user preference (e.g., a preference regarding child resistance, etc.), a plan sponsor preference, a prescriber preference, etc. The cap device 222 may also etch a message into the cap, although this process may be performed by a subsequent device in the high-volume fulfillment center.

The accumulation device 224 accumulates various containers of prescription drugs in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218. The accumulation device 224 may be used to group the prescription containers prior to shipment to the member.

The literature device 228 prints, or otherwise generates, literature to include with each prescription drug order. The literature may be printed on multiple sheets of substrates, such as paper, coated paper, printable polymers, or combinations of the above substrates. The literature printed by the literature device 228 may include information required to accompany the prescription drugs included in a prescription order, other information related to prescription drugs in the order, financial information associated with the order (for example, an invoice or an account statement), etc.

In some implementations, the literature device 228 folds or otherwise prepares the literature for inclusion with a prescription drug order (e.g., in a shipping container). In other implementations, the literature device 228 prints the literature and is separate from another device that prepares the printed literature for inclusion with a prescription order.

The packing device 226 packages the prescription order in preparation for shipping the order. The packing device 226 may box, bag, or otherwise package the fulfilled prescription order for delivery. The packing device 226 may further place inserts (e.g., literature or other papers, etc.) into the packaging received from the literature device 228. For example, bulk prescription orders may be shipped in a box, while other prescription orders may be shipped in a bag, which may be a wrap seal bag.

The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, etc.). The packing device 226 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise.

The unit of use packing device 230 packages a unit of use prescription order in preparation for shipping the order. The unit of use packing device 230 may include manual scanning of containers to be bagged for shipping to verify each container in the order. In an example implementation, the manual scanning may be performed at a manual scanning station. The pharmacy fulfillment device 112 may also include a mail manifest device 232 to print mailing labels used by the packing device 226 and may print shipping manifests and packing lists.

While the pharmacy fulfillment device 112 in FIG. 2 is shown to include single devices 206-232, multiple devices may be used. When multiple devices are present, the multiple devices may be of the same device type or models, or may be a different device type or model. The types of devices 206-232 shown in FIG. 2 are example devices. In other configurations of the system 100, lesser, additional, or different types of devices may be included.

Moreover, multiple devices may share processing and/or memory resources. The devices 206-232 may be located in the same area or in different locations. For example, the devices 206-232 may be located in a building or set of adjoining buildings. The devices 206-232 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

FIG. 3 illustrates the order processing device 114 according to an example implementation. The order processing device 114 may be used by one or more operators to generate prescription orders, make routing decisions, make prescription order consolidation decisions, track literature with the system 100, and/or view order status and other order related information. For example, the prescription order may be comprised of order components.

The order processing device 114 may receive instructions to fulfill an order without operator intervention. An order component may include a prescription drug fulfilled by use of a container through the system 100. The order processing device 114 may include an order verification subsystem 302, an order control subsystem 304, and/or an order tracking subsystem 306. Other subsystems may also be included in the order processing device 114.

The order verification subsystem 302 may communicate with the benefit manager device 102 to verify the eligibility of the member and review the formulary to determine appropriate copayment, coinsurance, and deductible for the prescription drug and/or perform a DUR (drug utilization review). Other communications between the order verification subsystem 302 and the benefit manager device 102 may be performed for a variety of purposes.

The order control subsystem 304 controls various movements of the containers and/or pallets along with various filling functions during their progression through the system 100. In some implementations, the order control subsystem 304 may identify the prescribed drug in one or more than one prescription orders as capable of being fulfilled by the automated dispensing device 214. The order control subsystem 304 may determine which prescriptions are to be launched and may determine that a pallet of automated-fill containers is to be launched.

The order control subsystem 304 may determine that an automated-fill prescription of a specific pharmaceutical is to be launched and may examine a queue of orders awaiting fulfillment for other prescription orders, which will be filled with the same pharmaceutical. The order control subsystem 304 may then launch orders with similar automated-fill pharmaceutical needs together in a pallet to the automated dispensing device 214. As the devices 206-232 may be interconnected by a system of conveyors or other container movement systems, the order control subsystem 304 may control various conveyors: for example, to deliver the pallet from the loading device 208 to the manual fulfillment device 216 from the literature device 228, paperwork as needed to fill the prescription.

The order tracking subsystem 306 may track a prescription order during its progress toward fulfillment. The order tracking subsystem 306 may track, record, and/or update order history, order status, etc. The order tracking subsystem 306 may store data locally (for example, in a memory) or as a portion of the order data 118 stored in the storage device 110.

Block Diagrams

FIG. 4 is a functional block diagram of the environment including a system according to the principles of the present disclosure. In this example architecture, a patient app 404 may provide a primary interface to a user (in the healthcare context, the user may be referred to as a patient). The patient app 404 is installed on a user device 408 of the user, such as a smartphone. The patient app 404 may be downloaded from a digital distribution platform 412, such as the App Store from Apple Inc. or the Play store from Alphabet Inc.

Executable sequences may be generated, adapted, and implemented by a care decision management module 420. The care decision management module 420 obtains data from a fast healthcare interoperability resources (FHIR) server 424. In various implementations the FHIR server 424 may be replaced by or supplemented with another server configured to store electronic health records (EHRs).

The FHIR server 424 holds a longitudinal patient record that offers an end-to-end view of the patient. The FHIR server 424 may provide access to data via an FHIR application program interface (API). The FHIR server 424 may store user demographics, clinical information, interactions, and provided content. The FHIR server 424 may provide a history of interactions to the patient app 404 to allow the user to review their history including, in various implementations, previously accessed content (such as articles and videos).

The FHIR server 424 provides data to a data warehouse 428 as input for program reporting and dashboards. The data warehouse 428 may include data represented at 430, including identified behavioral conditions, current behavioral engagements, and program outcomes. The data warehouse 428 may serve as a source for selecting users to invite for enrollment. Behavioral conditions may indicate whether a user would benefit from enrollment in a digital behavioral experience. Eligibility data may indicate insurance and/or payment information for the user. For example, a lack of insurance may decrease the user's likelihood of selection. Plan data may indicate whether relevant benefits are included in a health plan. Current engagements may indicate whether the individual is already engaged in improving behavioral health outside of the present system. For example, engagement with other programs may decrease the user's likelihood of selection.

The data warehouse 428 may be implemented using one or more of a data lake, a relational database, a column store, etc. In various implementations, some or all of the data for the data warehouse 428 may be exported into a tabular format such as XLSX. An analytics module 432 receives data from the data warehouse 428 and generates one or more analyses on the data. In various implementations, some or all data from the data warehouse 428 may be processed by a map-reduce module 434 before use by the analytics module 432. The analytics module 432 includes data represented at 436, such as behavioral condition models (depression, anxiety, etc.). The analytics module 432 may provide some or all analytic data back to the data warehouse 428 for storage and distribution. The analytics module 432 may be implemented using OpenSAE (structured analytic engine).

The data warehouse 428 receives model input from various sources, represented at 440. As one example of the model input 440, the storage devices 110 of FIG. 1 may provide data such as claims, encounters, and prescriptions. In various implementations, the model input 440 may be transformed, normalized, and/or otherwise converted using an extract/transform/load (ETL) process.

A reporting module 444 may be implemented to generate reports based on queries to the data warehouse 428. These reports are graphically represented at 446 and may include one or more of initiation rate, engagement, compliance, completion rate, and net promoter score (NPS).

A customer interaction manager 448 may be implemented to select users for participation in the system. This selective participation may be used during a rollout to focus energies of the operator on those who would benefit the most and may be used even after rollout to efficiently address those users who would benefit from the current system. For example, a candidate selection component such as a candidate selection mechanism 452 may identify users from the data warehouse 428 who have a threshold comfort level with technology. This level may be inferred from previous usage of technological offerings, from age, etc.

Based on candidates selected, an engagement engine 456 reaches out to users selected by the candidate selection mechanism 452. The engagement engine 456 may consider contact preferences and privacy rules to ensure all contacts are appropriate. The engagement engine 456 then initiates a communication with each vetted user. This communication may take the form of an email, a text message, a phone call, etc. The communication may suggest that the user download the patient app 404 and may even include an electronic mechanism to directly access the digital distribution platform 412. Contacted users may then be identified to the FHIR server 424.

A survey module 460 may provide survey questions to the patient app 404 and record responses. Though not shown in FIG. 4, these responses may be provided to the FHIR server 424. The survey module 460 may tailor questions to the user—for example, by adapting the questions to prior responses to survey questions from the user. In various implementations, the survey module 460 may be implemented within the patient app 404 or may be implemented using a remote system, which may or may not be operated by a third party. For example only, the survey module 460 may be implemented using an Elevate survey platform.

A content mediation module 464 may access online content from multiple content providers, including content providers that are separate from the operator of the present system. For example, this content may include wellness articles, video content, step-by-step exercise instructions, etc. In various implementations, content (such as HTML articles, HTML5 videos, rich media, etc.) may be provided by third parties such as Healthwise and Happify.

The patient app 404 may provide a direct connection or referral to a virtual clinician portal 468. For example, the virtual clinician portal 468 may include MDLIVE. The virtual clinician portal 468 may offer one or more APIs to the patient app 404. For example, the APIs may include a provider search to locate a provider that is a suitable match for the patient, including availability, specialization, and insurance considerations. Another API may include patient scheduling, which may allow for the scheduling of a virtual or in person health visit. Another API may facilitate the actual visit, such as allowing the user to check in at a physical location or to interact with a clinician virtually via the user device 408.

The virtual clinician portal 468 may also provide an API to allow the provision of data and documents, such as documents in the portable document format (PDF) format. For example, a history info packet generator 472 may generate a human-readable report for a clinician based on data from the FHIR server 424. An exchange manager 474 may be implemented in addition to or in place of the history info packet generator 472 to manage the exchange of data between the virtual clinician portal 468 and the FHIR server 424.

Data regarding visits and other interactions with the virtual clinician portal 468 may be provided to a claims processing module 478 for tracking and processing of claims, including the payment of commissions.

In various implementations, a provider match module 482 may assist the user in selecting a clinician through the patient app 404. In various implementations, the provider match module 482 may be implemented using the ElasticSearch search platform from Elastic NV.

A data integration module 486 obtains data from third-party apps 490 and third-party devices 494. For example, third-party apps 490 may include a health portal, such as the Health app from Apple Inc. and the Connect app from Garmin Ltd. Data from the third-party apps 490 may include exercise information, nutrition information, step count, etc. Data from the third-party devices 494 may be provided through the third-party apps 490 and/or may be provided directly to the data integration module 486. For example, third-party devices 494 may include a smart scale, a smartwatch, a network connected blood pressure cuff, a blood glucose monitor, etc.

Figure 5:
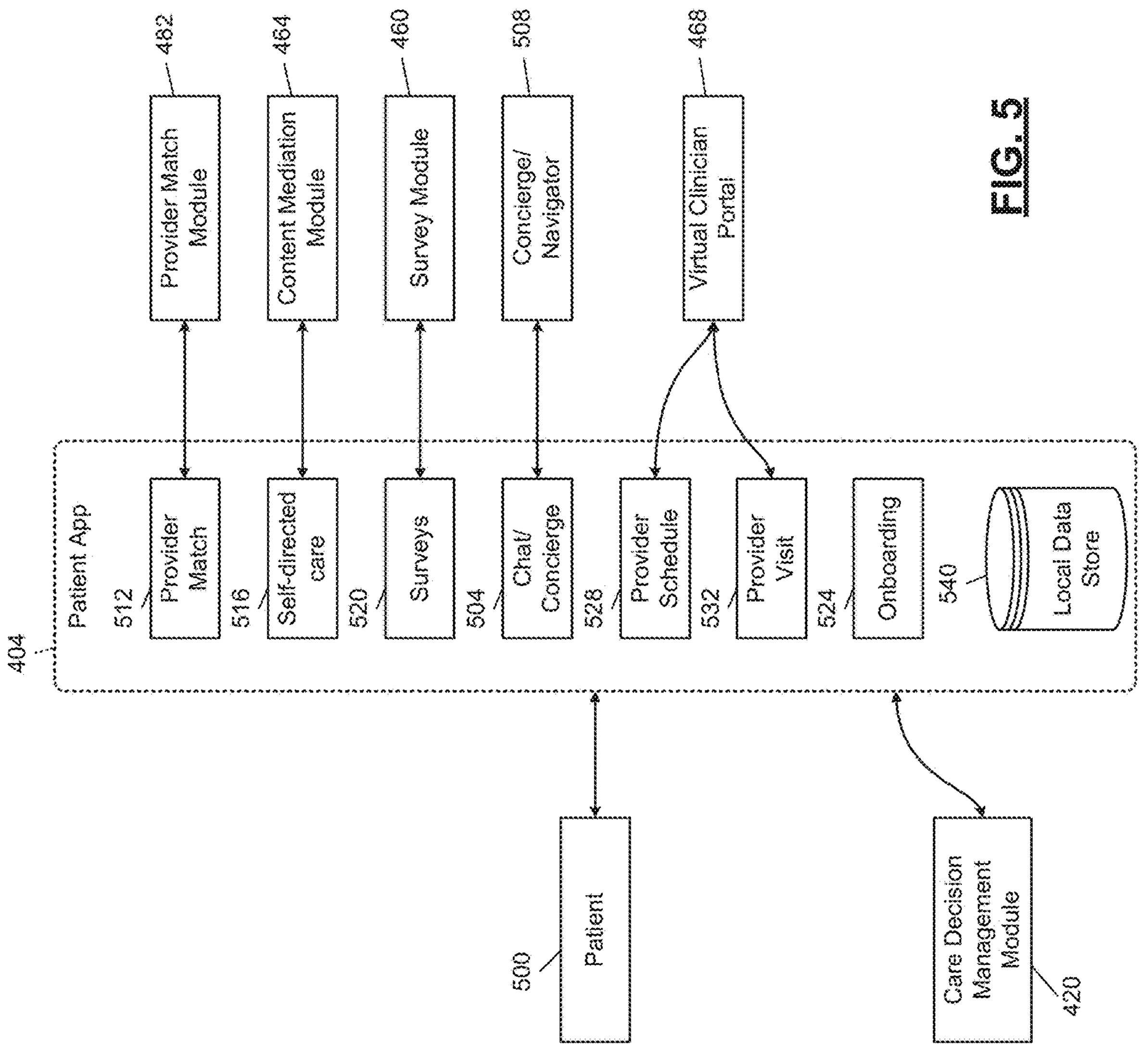
FIG. 5 is a functional block diagram of an example implementation of a patient app according to the principles of the present disclosure.

In FIG. 5, an example set of functional blocks of the patient app 404 are shown. A patient is graphically represented at 500 and interacts with the patient app 404 via the user device 408 (not shown in FIG. 5 for simplicity). The patient app 404 includes a chat function 504, which may also be referred to as a concierge function. The chat function connects the patient 500 to a concierge 508, also referred to as a navigator.

The concierge 508 may include an artificial intelligence (AI) agent based on natural language processing (NLP) for text chat or audio chat. Audio chat may also incorporate voice recognition. Additionally or alternatively, the concierge 508 may include a human. In various implementations, an escalation from AI agent to a human may be performed as necessary. The chat function 504 may allow the patient 500 to access help with the patient app 404, with scheduling clinician visits, with selecting a clinician, or with help regarding their clinical state.

A provider match function 512 may enable the patient 500 to search for a behavioral provider or other clinician based on, for example, traditional search criteria plus an expanded digital experience including preferences defined by the patient 500. Search criteria may be determined from patient records and/or provided by the patient 500 themselves. Criteria may include location, gender, marital status, LGBTQIA information, and life experiences. A self-directed care function 516 may include content display, such as content from the content mediation module 464 of FIG. 4. The patient 500 may access the content and the self-directed care function 516 as needed and/or may be prompted or reminded by the patient app 404. For example, the threshold may be based on number of minutes to read or watch the content.

A surveys function 520 may collect behavioral and other pertinent information from the client. The surveys function 520 may be part of an onboarding function 524. The onboarding function may include review and approval of terms of surface, gathering demographic information, an initial behavioral survey, and gathering criteria used for the provider match function 512. The surveys function 520 may attempt to gather information on a daily basis from the patient 500. In various implementations, the surveys function 520 may rely on the survey module 460 of FIG. 4.

In various implementations, the surveys function 520 may be tailored based on prior interactions with the patient 500. For example, survey questions may be tailored to specific concerns associated with the patient 500 and a scope of the survey may be tailored to increase engagement by the patient 500. For example, a machine learning model may receive as training inputs data regarding how frequently the patient 500 responds to survey questions. The feature vector for machine learning model may include times of day, days of the week, and survey length.

A provider schedule function 528 may allow the patient 500 to schedule an in person or virtual visit. For example, the provider schedule function 528 may interact directly with the virtual clinician portal 468 of FIG. 4 via a scheduling API. The provider schedule function 528 may be initiated by the care decision management module 420 of FIG. 4 as part of an executable sequence. A provider visit function 532 may provide telephonic connection with the virtual clinician portal 468 and may also include video. The provider visit function 532 may be automatically triggered by the provider schedule function 528 in response to a start time of a scheduled virtual visit. A local data store 540 stores preferences of the patient 500 and they also store data for various functions, such as scheduled visits from the provider schedule function 528 and survey responses, and a record of content viewed through the self-directed care function 516.

In FIG. 6, an example implementation of the care decision management module 420 includes an entity analysis module 604. The entity analysis module 604 determines relevant states for an entity, such as a specific patient. This state determination may be based on rules in a rules data store 608 and/or machine learning (ML) models 612. The entity analysis module 604 may evaluate the rules of the rules data store 608 and/or provide inputs to the ML models 612 based on data from the FHIR server 424. The received data may include clinical data, manual inputs, connected device readings, etc.

The entity analysis module 604 may determine, as an example, whether the entity is associated with a specific diagnosis. If so, one set of states may be available; otherwise, a second set of states may be available. Once one or more states is determined for the entity, these states are provided to a sequence scheduling module 616. The sequence scheduling module 616 retrieves executable sequences from an executable sequence library 620 based on the designated states. These sequences are scheduled for execution into a scheduled sequences data store 624. For example, the scheduled sequences data store 624 may include specific dates and times when actions will be executed, or may specify periodic intervals.

These actions may include obtaining a reading, such as blood pressure or heart rate, requesting user input, suggest as to survey questions, communication from the entity to a provider, and communication from the provider to the entity. In various implementations, a scheduled action may include a provider, such as a pharmacist or pharmacy tech, reaching out to the entity regarding a prescription to increase adherence. In various implementations, an automated communication may be provided to the entity, such as via email, text message, or on-device notification.

An analytics platform 628 tracks information about which actions are scheduled and which actions are executed. The analytics platform 628 may provide data to a dynamic sequence adaptation module 632 to personally adapt the executable sequences in the executable sequence library 620 to the user. For example, based on information regarding how frequently the entity responds to notifications at different times of the day, the dynamic sequence adaptation module 632 may revise certain actions within certain executable sequences to adjust the time of day to increase engagement.

A sequence execution module 636 is responsible for executing actions that have been scheduled in the scheduled sequences data store 624. Examples of execution mechanisms include a provider interface module 640, a patient interface module 644, and a side channel management module 648. The provider interface module 640 may interact with one or more providers to request that the provider initiate communication with the entity. For example, this communication may be a phone call from a pharmacist to discuss medication, a scheduling text message from the office staff of a clinician to schedule an appointment, etc.

The patient interface module 644 is responsible for communications through the patient app 404. For example, these communications may be notifications within the patient app 404 and notifications presented to an operating system of the user device 408 (within which the patient app 404 is operating). The side channel management module 648 initiates communication with an entity via a mechanism other than the patient app 404. For example, these communication mechanisms or channels may include email, text message, pre-recorded call, fax, postal mail, in-browser notifications, etc.

In various implementations, a rule generation module 652 generates rules for the rules data store 608 and/or the care decision management module 420 generally. These rules may be informed by clinician input received from a clinician user interface 656. For example, the clinician user interface 656 may provide a clinician with the ability to choose characteristics (such as blood pressure, blood glucose levels, etc.) and set satisfaction criteria for those inputs. For example, satisfaction criteria may include upper thresholds, lower thresholds, ranges, etc. The rule generation module 652 encodes these inputs into rules for the rules data store 608 and/or the care decision management module 420 generally.

Similarly, an executable sequence generation module 660 may generate executable sequences for the executable sequence library 620 based on input from the clinician user interface 656. For example, the clinician may specify which actions should be taken for each state in which the entity can be found.

In various implementations, the clinician user interface 656 may directly control executable sequences in the executable sequence library, using a low-code or no-code programming interface. Similarly, the clinician user interface 656 may directly control satisfaction criteria within the rules data store 608 and/or the care decision management module 420 generally. In various implementations, the rules data store 608, rule generation module 652, executable sequence library 620, and/or the executable sequence generation module 660 may be implemented using the Camunda workflow system or the Amazon Web Services (AWS) step functions workflow system from Amazon Web Services, Inc.

An operator user interface 668 may allow an operator to control the executable sequence library 620 and/or the rules of the rules data store 608. For example, the operator may correctly manipulate satisfaction criteria or executable actions based on an understanding of the conditions desires as well as parameters of the system. The operator user interface 668 may also allow an operator to control training of the ML models 612. For example, only the operator may provide training samples from a clinician's evaluation of an entity. The ML models 612 may then supplant the rules of the rules data store 608.

In various implementations, feedback from clinicians regarding how accurately states have been assigned may be fed back to the ML models 612 as training data. The feature vectors for the ML models 612 may include a subset or a superset of the conditions evaluated by the rules of the rules data store 608. For example, the ML models 612 may include additional features not specified by any of the rules of the rules data store 608 and a significance analysis (such as a principal components analysis) of the features may allow a reduced feature vector to be used by the ML models 612. This feature vector may match or, in some cases, may demurrage from the set of inputs that dictate operation to rules of the rules data store 608.

Flowcharts

Figure 7:
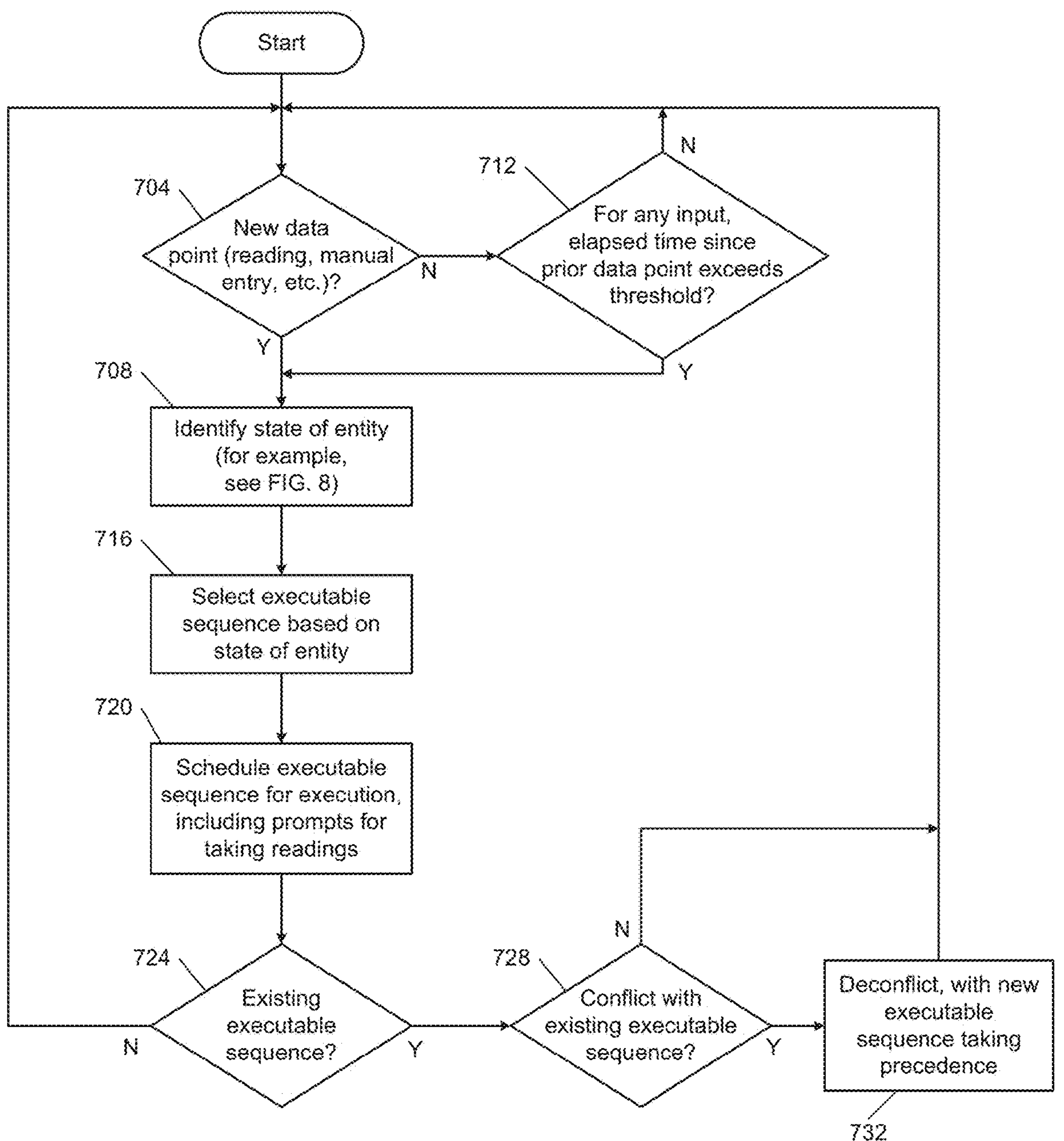
FIG. 7 is a flowchart of example analysis and scheduling operation for care decision management.

FIG. 7 is a graphical illustration of operation of the care decision management module 420. In various implementations, the flow corresponds to some of the operations performed by the entity analysis module 604 and the sequence scheduling module 616. Control begins at 704, where control determines whether a new data point is available. If so, control transfers to 708; otherwise, control transfers to 712. A new data point may be a new measurement or reading, such as a step count, a heart rate, a blood glucose level, etc. The new data point may also a manual entry, such as self-reporting of mental or emotional state, a food log, a description of physical features, such as leg swelling or shortness of breath, etc.

At 712, control determines whether, for any input, the elapsed time since the most recent data point exceeds a certain threshold. If so, control transfers to 708; otherwise, control returns to 704. For example, each input may have a different threshold. As one example, if a weight has not been received for more than seven days, the state of the entity may change based on this lack of reading.

In 708, control identifies the state of the entity (such as a patient). For example, the state of the entity may be determined as shown in FIG. 8. Control continues at 716, where control selects an executable sequence based on the state of the entity. For example, there may be a one-to-one or many-to-one correspondence from identified states to executable sequences.

Control continues at 720, where control schedules the selected executable sequence for execution. For example only, the executable sequence may include reminders to take readings. These reminders may be encoded such that they generate notifications on a user device or generate other forms of reminders, such as text messages, emails, etc. At 724, control determines whether there is an existing executable sequence already scheduled for the entity. If so, control transfers to 728; otherwise, control returns to 704.

At 728, control determines whether there is a conflict between the existing executable sequence and the new executable sequence. If so, control transfers to 732; otherwise, control returns to 704. At 732, control deconflicts the new executable sequence with the existing executable sequence. For example, a previous executable sequence may have specified a weight reading once a week while the new executable sequence specifies a weight reading being performed daily. To deconflict these two, the new executable sequence may take precedence with daily weight readings being scheduled. Without deconfliction, each seventh day may include two requests for a weigh-in. In various implementations, deconfliction may be skipped entirely and the previous executable sequence may simply be removed in favor of the new executable sequence. However, deconfliction may be beneficial in situations where executable sequences are scheduled for different conditions, such as for congestive heart failure as well as for type 2 diabetes. Following 732, control returns to 704.

In FIG. 8, example operation for identifying the state of an entity begins at 804. At 804, control evaluates the entity. For example, the evaluation may include determining a diagnosis state for a set of clinical conditions. For example, when CHF and diabetes are relevant clinical conditions, the entity may be evaluated to determine whether the entity is diagnosed with diabetes, is pre-diabetic, or has low diabetes concerns. Similarly, the entity may be evaluated to determine whether a diagnosis of CHF has been made or whether CHF is a risk but has not yet been diagnosed.

At 808, control determines a set of prioritized states according to the entity evaluation. For example, normal, intervention, and escalation states may be present for a pre-CHF diagnosis and a separate set of normal, intervention, and escalation states may be defined for a post-CHF diagnosis. At 812, control selects the highest priority state from among the set. For example, the escalation state may be higher priority than the intervention state while the intervention state is higher priority than the normal state.

At 816, control obtains a set of trigger conditions for the selected state. Control also clears the state flag. The state flag is used to indicate whether the current state should be selected for the entity. The state flag is set so that each triggering condition can be evaluated and reported when the state is selected.

At 820, control selects the first trigger condition from the set. At 824, control evaluates the selected trigger condition to determine whether the satisfaction criteria of the selected trigger condition are met. For example only, the satisfaction criteria may include a calculation, a threshold, a range, a qualitative analysis, a natural language processing (NLP) evaluation of a textual input, etc.

At 828, if the evaluation determined that the selected trigger condition was satisfied, control transfers to 832; otherwise, control transfers to 836. At 832, control determines whether verification of the selected triggered condition is required. For example, verification may be required for readings that are known to be variable or noisy. For example, a blood pressure reading may be considered unreliable. If verification is required, control transfers to 840; otherwise, control transfers to 844. At 840, if verification is complete, control transfers to 844.

For example, the verification may be complete if the trigger condition has been satisfied two times in a row or if a more complicated verification criteria has been satisfied. For example, a verification criteria may require that readings taken on consecutive days satisfy the current condition rather than readings that are taken within minutes of each other. If verification is not complete, control transfers to 848. At 848, control schedules of verification action and returns to 836. For example, a verification action may include scheduling a follow-up reading for an hour later, a day later, a week later, etc.

At 844, verification is either complete or not required. Control sets the state flag indicating that the current state has experienced at least one current condition. Control then adds the satisfied triggered condition to a set for reporting purposes. Control then continues at 836. Control determines whether there are any additional trigger conditions for evaluation. If so, control transfers to 852, where the next trigger condition is selected and control continues at 824.

If no trigger conditions for the state remain, control transfers to 856. At 856, if the state flag is set, control transfers to 860 where the selected state is declared as active and the set of satisfied trigger conditions is noted. For example, a clinician may use the set of satisfied triggered conditions when evaluating next best actions for the entity. Control then ends. For example, control may end by returning to FIG. 7.

At 856, if the state flag is not set, control transfers to 864. At 864, if there is an additional state to evaluate, control transfers to 868, where the next-highest-priority state is selected and control continues at 816. If, at 864, there are no additional states, control transfers to 872, where the default state is declared as active. For example, the default state may be referred to as a stable, normal, or baseline state. In various implementations, the default state may correspond to an executable action sequence having the fewest actions with the longest intervals between the actions. Control then ends.

Conclusion

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in a different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements as well as an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set—in other words, in some circumstances a "set" may have zero elements. The term "non-empty set" may be used to indicate exclusion of the empty set—in other words, a non-empty set will always have one or more elements. The term "subset" does not necessarily require a proper subset. In other words, a "subset" of a first set may be coextensive with (equal to) the first set. Further, the term "subset" does not necessarily exclude the empty set—in some circumstances a "subset" may have zero elements.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" can be replaced with the term "controller" or the term "circuit." In this application, the term "controller" can be replaced with the term "module."

The term "module" may refer to, be part of, or include processor hardware (shared, dedicated, or group) that executes code and memory hardware (shared, dedicated, or group) that stores code executed by the processor hardware.

The module may include one or more interface circuit(s). In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2020 (also known as the WIFI wireless networking standard) and IEEE Standard 802.3-2018 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

The memory hardware may also store data together with or separate from the code. Shared memory hardware encompasses a single memory device that stores some or all code from multiple modules. One example of shared memory hardware may be level 1 cache on or near a microprocessor die, which may store code from multiple modules. Another example of shared memory hardware may be persistent storage, such as a solid state drive (SSD) or magnetic hard disk drive (HDD), which may store code from multiple modules. Group memory hardware encompasses a memory device that, in combination with other memory devices, stores some or all code from one or more modules. One example of group memory hardware is a storage area network (SAN), which may store code of a particular module across multiple physical devices. Another example of group memory hardware is random access memory of each of a set of servers that, in combination, store code of a particular module.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:

memory hardware configured to store instructions and a data store; and processor hardware configured to execute the instructions, wherein the instructions include:

in response to designation of an entity within the data store:

obtaining information corresponding to the designated entity from the data store, wherein the obtained information includes at least one of prescription information, medical information, exercise information, nutrition information, or lab information;

obtaining a plurality of responses, wherein the plurality of responses is associated with a plurality of evaluation points;

based on a set of frequencies associated with the plurality of responses:

retraining a first machine learning model, and modifying the plurality of evaluation points using the retrained first machine learning model; and determining, via a second machine learning model, a health status of the designated entity based on the obtained information and the plurality of responses;

based on the health status of the designated entity, identifying a set of states and selecting a state from the set of states;

obtaining a set of trigger conditions for the selected state, wherein each trigger condition of the set of trigger conditions specifies a set of satisfaction criteria;

for each trigger condition of the set of trigger conditions, determining whether the trigger condition is satisfied by evaluating the set of satisfaction criteria of the trigger condition based on data corresponding to the designated entity;

selectively selecting another state from the set of states based on whether the trigger conditions of the set of trigger conditions are satisfied;

determining an executable sequence based on the selected state; and scheduling the executable sequence for execution.

2. The system of claim 1 wherein the selecting another state is performed in response to none of the set of trigger conditions being satisfied.

3. The system of claim 1 wherein the selecting another state is performed in response to at least one of the set of trigger conditions failing to be satisfied.

4. The system of claim 1 wherein the selecting another state is performed in response to a defined profile of the set of trigger conditions failing to be satisfied.

5. The system of claim 1 wherein:

verification is selectively specified for a trigger condition of the set of trigger conditions; and in response to verification being specified for the trigger condition, the trigger condition is determined to be satisfied only in response to successful verification of the satisfaction criteria of the trigger condition.

6. The system of claim 5 wherein the successful verification requires that the set of satisfaction criteria of the trigger condition be satisfied multiple times.

7. The system of claim 6 wherein the successful verification requires that the set of satisfaction criteria of the trigger condition be satisfied multiple times in greater than a specified time window.

8. The system of claim 7 wherein the specified time window is 24 hours.

9. The system of claim 1 wherein the executable sequence selectively includes transmitting a message soliciting data acquisition to a person corresponding to the designated entity.

10. The system of claim 9 wherein the transmitting specifies a communications channel selected from a plurality of specified communication channels.

11. The system of claim 9 wherein the transmitting includes transmitting a message to the person via a data acquisition device located at a residence of the person.

12. The system of claim 1 wherein the determining the executable sequence includes at least one of:

selecting the executable sequence from a data structure storing a plurality of executable sequences; or generating the executable sequence.

13. The system of claim 12 wherein the generating the executable sequence includes incorporating sequence elements based on input from a clinician user interface.

14. The system of claim 1 wherein the executable sequence selectively includes scheduling a point-to-point communication with a person corresponding to the designated entity.

15. The system of claim 1 wherein the data corresponding to the designated entity is based on electronic health records.

16. The system of claim 1 wherein the data store includes a relational database.

17. The system of claim 1 wherein:

each state of the set of states is associated with a priority; and the selecting initially selects a highest priority one of the set of states.

18. The system of claim 17 wherein:

the states include an escalation state, an intervention state, and a normal state;

a priority of the escalation state is higher than a priority of the intervention state; and the priority of the intervention state is higher than a priority of the normal state.

19. A computerized method comprising:

in response to designation of an entity within a data store:

obtaining information corresponding to the designated entity from the data store, wherein the obtained information includes at least one of prescription information, medical information, exercise information, nutrition information, or lab information;

obtaining a plurality of responses, wherein the plurality of responses is associated with a plurality of evaluation points;

based on a set of frequencies associated with the plurality of responses:

retraining a first machine learning model, and modifying the plurality of evaluation points using the retrained first machine learning model; and determining, via a second machine learning model, a health status of the designated entity based on the obtained information and the plurality of responses;

based on the health status of the designated entity, identifying a set of states and selecting a state from the set of states;

obtaining a set of trigger conditions for the selected state, wherein each trigger condition of the set of trigger conditions specifies a set of satisfaction criteria;

for each trigger condition of the set of trigger conditions, determining whether the trigger condition is satisfied by evaluating the satisfaction criteria of the trigger condition based on data corresponding to the designated entity;

selectively selecting another state from the set of states based on whether the trigger conditions of the set of trigger conditions are satisfied;

determining an executable sequence based on the selected state; and scheduling the executable sequence for execution.

20. A non-transitory computer-readable medium comprising processor-executable instructions, wherein the instructions include:

in response to designation of an entity within a data store:

obtaining information corresponding to the designated entity from the data store, wherein the obtained information includes at least one of prescription information, medical information, exercise information, nutrition information, or lab information;

obtaining a plurality of responses, wherein the plurality of responses is associated with a plurality of evaluation points;

based on a set of frequencies associated with the plurality of responses:

retraining a first machine learning model, and modifying the plurality of evaluation points using the retrained first machine learning model; and determining, via a second machine learning model, a health status of the designated entity based on the obtained information and the plurality of responses;

based on the health status of the designated entity, identifying a set of states and selecting a state from the set of states;

obtaining a set of trigger conditions for the selected state, wherein each trigger condition of the set of trigger conditions specifies a set of satisfaction criteria;

for each trigger condition of the set of trigger conditions, determining whether the trigger condition is satisfied by evaluating the satisfaction criteria of the trigger condition based on data corresponding to the designated entity;

selectively selecting another state from the set of states based on whether the trigger conditions of the set of trigger conditions are satisfied;

determining an executable sequence based on the selected state; and scheduling the executable sequence for execution.

* * * * *